US008379483B2

(12) United States Patent
Tang et al.

(10) Patent No.: US 8,379,483 B2
(45) Date of Patent: Feb. 19, 2013

(54) METHOD AND APPARATUS FOR DETERMINING RADIAL SHEAR VELOCITY VARIATION FROM DIPOLE ACOUSTIC LOGGING

(75) Inventors: Xiao Ming Tang, Sugar Land, TX (US); Douglas J. Patterson, Spring, TX (US)

(73) Assignee: Baker Hughes Incorporated, Houston, TX (US)

( * ) Notice: Subject to any disclaimer, the term of this patent is extended or adjusted under 35 U.S.C. 154(b) by 293 days.

(21) Appl. No.: 12/787,028

(22) Filed: May 25, 2010

(65) Prior Publication Data

US 2010/0309748 A1 Dec. 9, 2010

Related U.S. Application Data

(60) Provisional application No. 61/184,065, filed on Jun. 4, 2009.

(51) Int. Cl.
*G01V 1/00* (2006.01)
(52) U.S. Cl. ............. 367/75; 367/31
(58) Field of Classification Search .......... 367/31, 367/75
See application file for complete search history.

(56) References Cited

U.S. PATENT DOCUMENTS

| 5,146,432 | A | * | 9/1992 | Kimball et al. | 367/13 |
|---|---|---|---|---|---|
| 5,278,805 | A | * | 1/1994 | Kimball | 367/32 |
| 5,587,966 | A | * | 12/1996 | Kimball et al. | 367/31 |
| 5,654,938 | A | | 8/1997 | Tang | |
| 5,661,696 | A | * | 8/1997 | Kimball et al. | 367/31 |
| 5,687,138 | A | * | 11/1997 | Kimball et al. | 367/31 |
| 5,999,484 | A | * | 12/1999 | Kimball et al. | 367/31 |
| 6,449,560 | B1 | * | 9/2002 | Kimball | 702/6 |
| 6,611,761 | B2 | | 8/2003 | Sinha et al. | |
| 2002/0116128 | A1 | * | 8/2002 | Sinha et al. | 702/6 |
| 2002/0183930 | A1 | * | 12/2002 | Plona et al. | 702/6 |
| 2003/0010494 | A1 | * | 1/2003 | Bose et al. | 166/254.2 |
| 2006/0235617 | A1 | * | 10/2006 | Sinha et al. | 702/6 |
| 2006/0256655 | A1 | * | 11/2006 | Sinha et al. | 367/31 |
| 2006/0256656 | A1 | * | 11/2006 | Sinha et al. | 367/31 |
| 2008/0319675 | A1 | * | 12/2008 | Sayers | 702/11 |

OTHER PUBLICATIONS

Tang, X. M., and Patterson, D., "Mapping formation radial shear-velocity variation by a constrained inversion of borehole flexural wave dispersion data". SEG Annual Meeting. p. 503-507. Oct. 2010.*

Backus, G., and Gilbert F., Uniqueness in the inversion of inaccurate gross Earth data: Phil. Trans. Roy. Soc. (London), vol. 266, 123-192 (Mar. 5, 1970).

Schmitt, D. P., Shear-wave logging in elastic formations: J. Acoust. Soc. Am., 84, 2215-2229 (Dec. 1988).

Burridge, R., and Sinha, B.K., Inversion for formation shear modulus and radical depth of investigation using borehole flexural waves: 66th Annual International Meeting, SEG, Expanded Abstracts, 158-161 (1996).

Sinha, B. K., and Kostek, S., Stress-induced azimuthal anisotropy in borehole flexural waves: Geophysics, vol. 61, No. 6, 1899-1907 (Dec. 1996).

Tang, X. M., Processing dipole waveform logs for formation alteration identification: 65th Ann. Internat. Mtg., Soc. Expl. Geophys., Expanded Abstracts (1996).

(Continued)

*Primary Examiner* — Isam Alsomiri
*Assistant Examiner* — James Hulka
(74) *Attorney, Agent, or Firm* — Chowdhury & Georgakis, P.C.

(57) ABSTRACT

A radial shear velocity profile of an earth formation is obtained by using dipole and/or cross-dipole measurements. The non-uniqueness in the inversion is addressed by using a constraint based on the fact that high-frequency dipole shear waves are mostly sensitive to the near-borehole shear velocity.

18 Claims, 14 Drawing Sheets
(1 of 14 Drawing Sheet(s) Filed in Color)

OTHER PUBLICATIONS

Tang, X. and Chunduru, R. K., Simulations inversion of formation shear-wave anisotropy parameters from cross-dipole acoustic-array waveform data: Geophysics, Soc. of Expl. Geophys., vol. 64, No. 5, 1502-1511 (Sep. 1999).

Xia, J., Miller R.D., and Park, C.B., Advantages of calculating shear-wave velocity from surface waves with higher modes, 70th Ann. Internat. Mtg: Soc. of Expl. Geophys., Expanded Abstracts, 1295, (2000).

Tang, X., Wang, P. and Patterson, D., Multiple acoustic logging-while-drilling, 72nd Ann. Internat. Mtg: Soc. of Expl. Geophys., Expanded Abstracts, 364-368 (2002).

Wang, T., and Tang, X., Multpole acoustic responses of a prestressed formation: An effective medium approach: Geophysics, Soc. of Expl. Geophys., vol. 70, No. 2, F35-F44 (Mar. 2005).

Sinha, B., Bratton, T., Cryer, J., Nieting, S., Ugueto, G., Bakulin, A., and Hauser, M., Near-wellbore alteration and formation stress parameters using borehole sonic data, SPE 95841 (2005).

Sayers, C. M., Adachi, J., and Taleghani, A. D., The effect of near-wellbore yield on elastic wave velocities in sandstones: 78th Annual International Meeting, SEG, Expanded Abstracts, 339-343 (2008).

\* cited by examiner

METHOD AND APPARATUS FOR DETERMINING RADIAL SHEAR VELOCITY VARIATION FROM DIPOLE ACOUSTIC LOGGING

CROSS-REFERENCES TO RELATED APPLICATIONS

This application claims priority from U.S. Provisional Patent Application Ser. No. 61/184,065 filed on Jun. 4, 2009.

FIELD OF THE PRESENT DISCLOSURE

The present disclosure is in the field of acoustic logging of earth formations. Specifically, the present disclosure deals with the determination of radial shear velocity variation away from a borehole using dipole and cross-dipole measurements made in a borehole.

BACKGROUND OF THE PRESENT DISCLOSURE

Boreholes are drilled through earth formations for, among other reasons, extracting useful materials such as petroleum. Boreholes are usually drilled through the earth formations using a rotary drilling rig. The rig is used to turn a drill bit which cuts away at the earth formations. Commercial drill bits typically cut through the earth formations either by shearing or by compressively fracturing the earth formations. When a wellbore is drilled it is usually filled with a liquid suspension called "drilling mud", which is used to hydraulically clear away cuttings generated by the drill bit and by hydrostatic pressure to prevent pressurized fluids present in the pore spaces of the earth formations from entering the wellbore in an uncontrolled manner.

The drilling mud typically includes water as the continuous liquid phase and includes a number of chemical additives to reduce the effects of water on certain earth formations which may be reactive with water. The action of the drill bit in shearing or compressively fracturing the formations, combined with chemical action of the drilling mud on some earth formations, can change the acoustic velocity of some earth formations in the vicinity of the wellbore.

If the acoustic velocity has been changed in some formations as a result of the drilling process, it can be more difficult, for example, to correlate acoustic velocity well logs made in such formations to surface seismic surveys. Changes in acoustic velocity can also correspond to formations which are highly sensitive to the drilling process and may be mechanically unstable after drilling. Such mechanically unstable formations may be prone to "washing" or "caving" which can increase the risk of the drilling assembly becoming stuck in the wellbore. Such mechanically unstable formations may also be prone to production of formation solids during extraction of the petroleum, which can cause fouling or damage to production equipment.

Formation alteration has been associated with changes in the shear wave velocity in the vicinity of the wellbore wall. Changes in shear velocity in turn result in changes in dispersion properties of dipole acoustic waves propagating through such altered formations. It is an object of the disclosure to provide a method of signal processing for a dipole acoustic well logging instrument which can be used to identify earth formations which have been altered by the drilling process, by means of determining changes in the dispersion-inducing properties of the earth formations.

SUMMARY OF THE PRESENT DISCLOSURE

One embodiment of the disclosure is a method of evaluating an earth formation. The method includes: using a carrier for acquiring dipole acoustic data in a borehole, and using a processor for processing the acquired acoustic dipole data to estimate a dispersion curve of at least one shear wave in the earth formation and performing a constrained inversion of the dispersion curve of the at least one shear wave to estimate a radial shear velocity profile of the earth formation.

Another embodiment of the disclosure is an apparatus for evaluating an earth formation. The apparatus includes: a carrier configured to acquire acoustic dipole data in a borehole, and at least one processor configured to process the acquired dipole data to estimate a dispersion curve of at least one shear wave in the earth formation and perform a constrained inversion of the dispersion curve of the at least one shear wave to estimate a radial shear velocity profile of the earth formation.

Another embodiment of the disclosure is a computer-readable medium product having stored thereon instructions that when read by at least one processor cause the at least one processor to execute a method, the method comprising: processing acquired acoustic dipole data acquired in a borehole to estimate a dispersion curve of at least one shear wave in the earth formation and performing a constrained inversion of the dispersion curve of the at least one shear wave to estimate a radial shear velocity profile of the earth formation.

BRIEF DESCRIPTION OF THE DRAWINGS

The file of this patent contains at least one drawing executed in color: Copies of this patent with color drawing(s) will be provided by the Patent and Trademark Office upon request and payment of the necessary fee.

The present disclosure is best understood with reference to the accompanying figures in which like numerals refer to like elements and in which.

DETAILED DESCRIPTION OF ILLUSTRATIVE EMBODIMENTS

Figure 1:
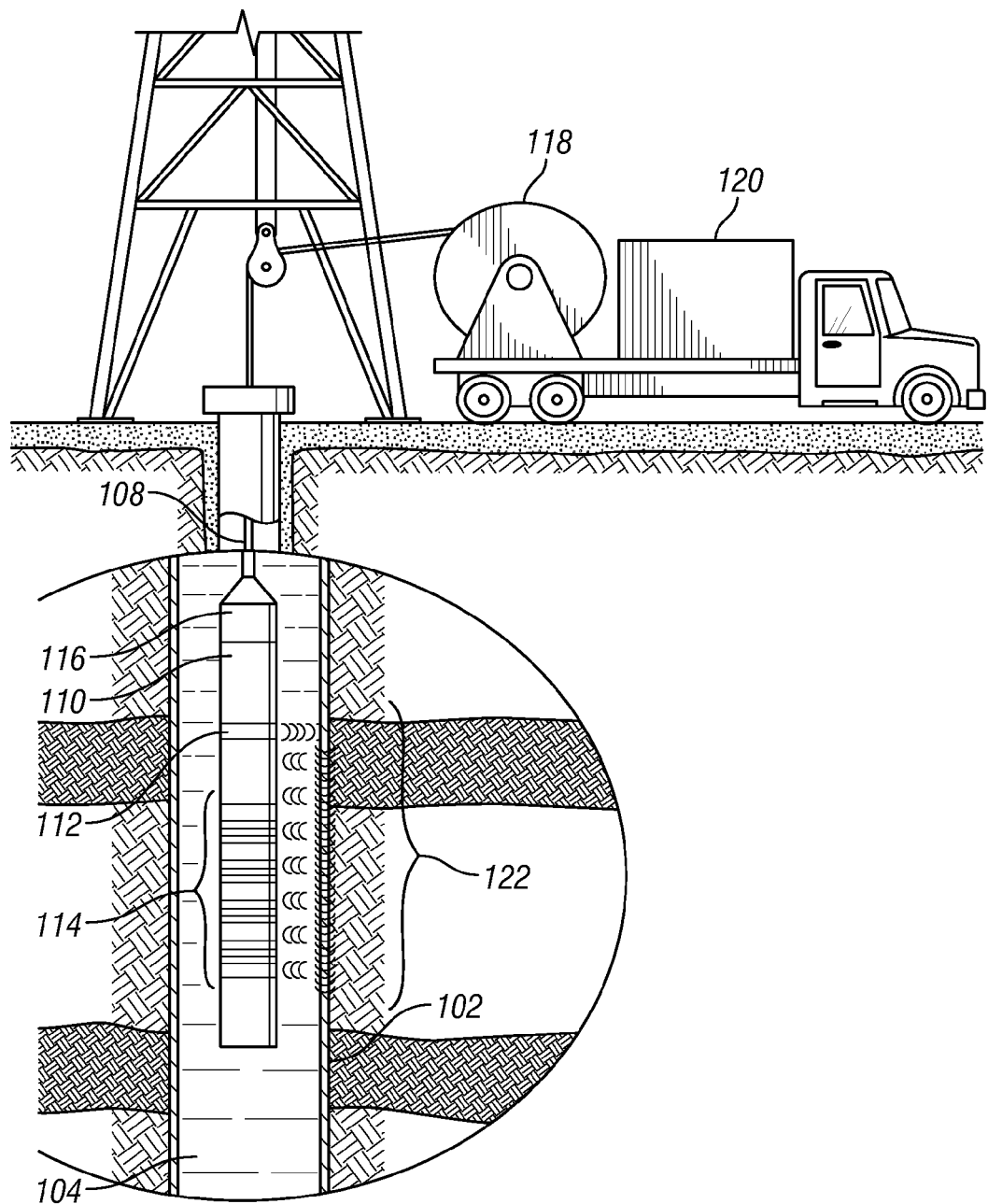
FIG. 1 shows a dipole acoustic well logging instrument disposed in a wellbore.

In order to determine alteration of earth formations, the present disclosure can use signals generated by a dipole acoustic well logging instrument. The logging instrument is disposed in a liquid-filled wellbore drilled through the earth formations. Dipole acoustic well logging instruments which can be used to practice the method of the disclosure are known in the art. FIG. 1 shows the acoustic logging instrument 110 suspended in the wellbore 102 at one end of an armored electrical cable 108. The cable 108 can be extended into and withdrawn from the wellbore 102 by means of a winch 118 or similar spooling device known in the art. The surface end of the cable 108 is typically electrically connected to a recording unit/processor 120, which can be used for performing the method of the disclosure.

The acoustic logging instrument 110 can include a dipole transmitter 112 which is periodically energized to emit pulses of acoustic energy 122 into the fluid 104 in the wellbore. The acoustic energy pulses 122 typically travel outward and then propagate along the wellbore 102 wall. The energy pulses 122 can eventually reach receivers 114 positioned at axially spaced apart locations along the instrument 110. The receivers 114 generate electrical voltage signals in response to the detected acoustic energy pulses 122.

The acoustic logging instrument 110 can also include a telemetry/signal processing unit 116 which imparts signals to the cable 108. The signals imparted to the cable 108 can correspond to the receiver 114 electrical voltage signals in digital form. The signals imparted to the cable 108 can be decoded and interpreted in the recording unit 120. For the purposes of the present disclosure, the dipole transmitter 112 and the receivers 114 may be referred to as being on a "carrier".

Figure 2:
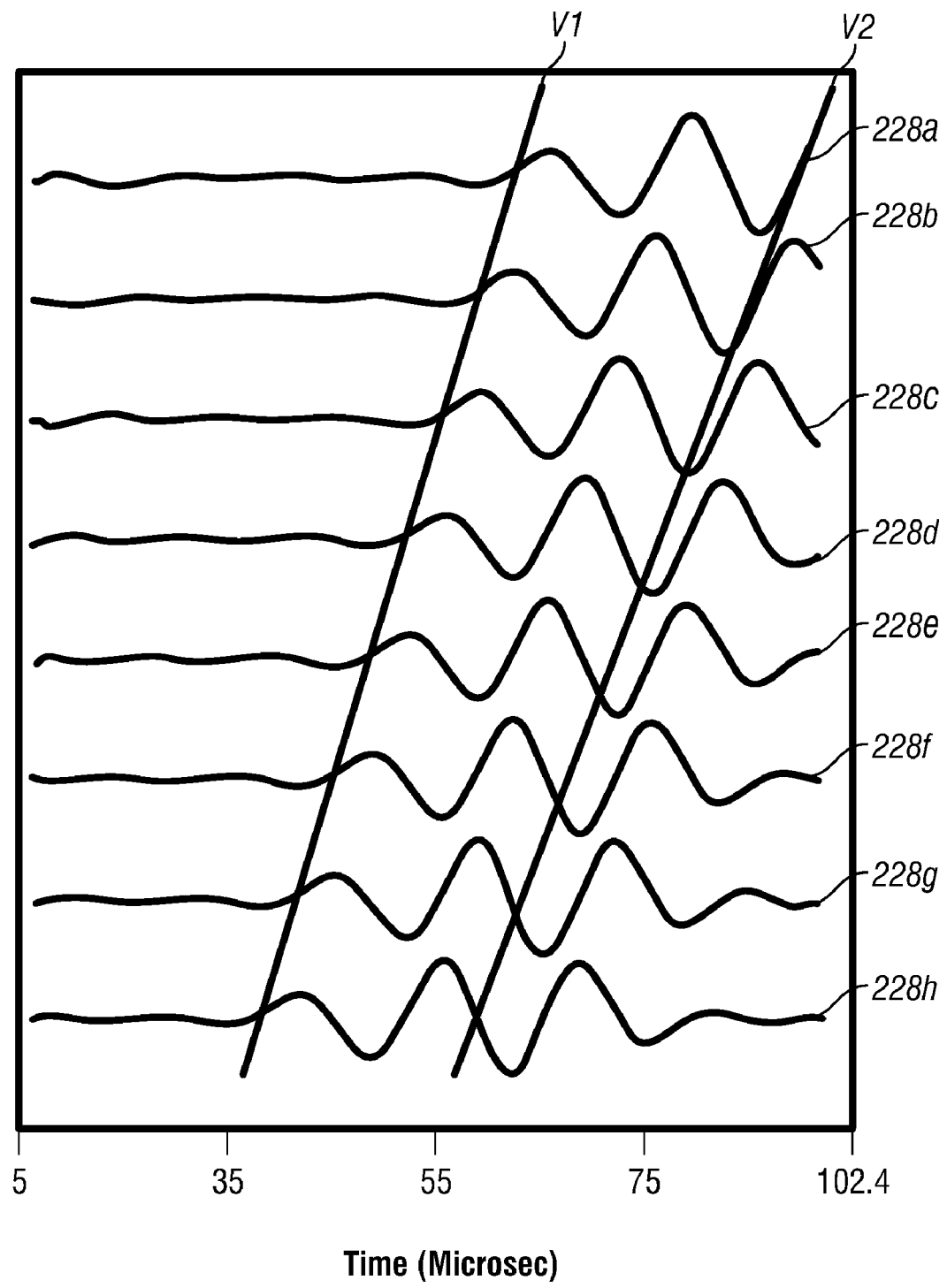
FIG. 2 shows waveforms of signals generated by receivers on the instrument of FIG. 1.

FIG. 2 shows a graph of typical signals generated by the receivers (114 in FIG. 1) in response to detection of the acoustic energy pulses (122 in FIG. 1). Curves 228a-228h, called signal waveforms, correspond individually to the voltage signals generated by each of the receivers 114 (which in the present embodiment can be eight in number) included on the acoustic logging instrument (110 in FIG. 1). The abscissa in the plots is time and the ordinate is the source to receiver distance. Also shown in FIG. 2 are lines V1 (corresponding to the first arrival) and V2 (corresponding to the peak energy). The difference in slopes of the two lines is an indication that the velocity of propagation depends upon frequency, i.e., that the waves are dispersive. The present disclosure analyzes these dispersive waveforms to estimate the formation properties away from the borehole.

The borehole flexural wave excited by a dipole acoustic tool is a dispersive guided wave propagating along borehole. In general, the wave dispersion characteristics are governed by the dispersion equation:

$$D(k,\omega;B,F(r))=0, \quad (1)$$

where k is wavenumber and ω is angular frequency, and "B" refers to the borehole portion of the waveguide consisting of borehole fluid and, when tool size is not negligible, a logging tool; "F(r)" refers to an elastic, isotropic formation whose property (i.e., P- and S-wave velocity and density) can vary with radial distance r. Solving the dispersion equation for each frequency, we find the wavenumber k for the flexural wave mode, from which the wave phase velocity or slowness (inverse of velocity) is obtained as $$V(\omega)=\omega/k, \text{ or } S(\omega)=1/V(\omega)=k/\omega \quad (2)$$

Using the above approach, the theoretical dispersion curve for the borehole flexural waves can be calculated. The dispersion curve is a function that represents the velocity (or its reciprocal, the slowness), as a function of frequency. A continuously varying radial profile can be approximated as a multi-layered cylindrical structure with stair-case variations. For the multiple layer structure, the dispersion equation is solved using the Thomsen-Haskell propagation matrix method (Schmitt, 1988; Tang and Cheng, 2004).

Figure 3:
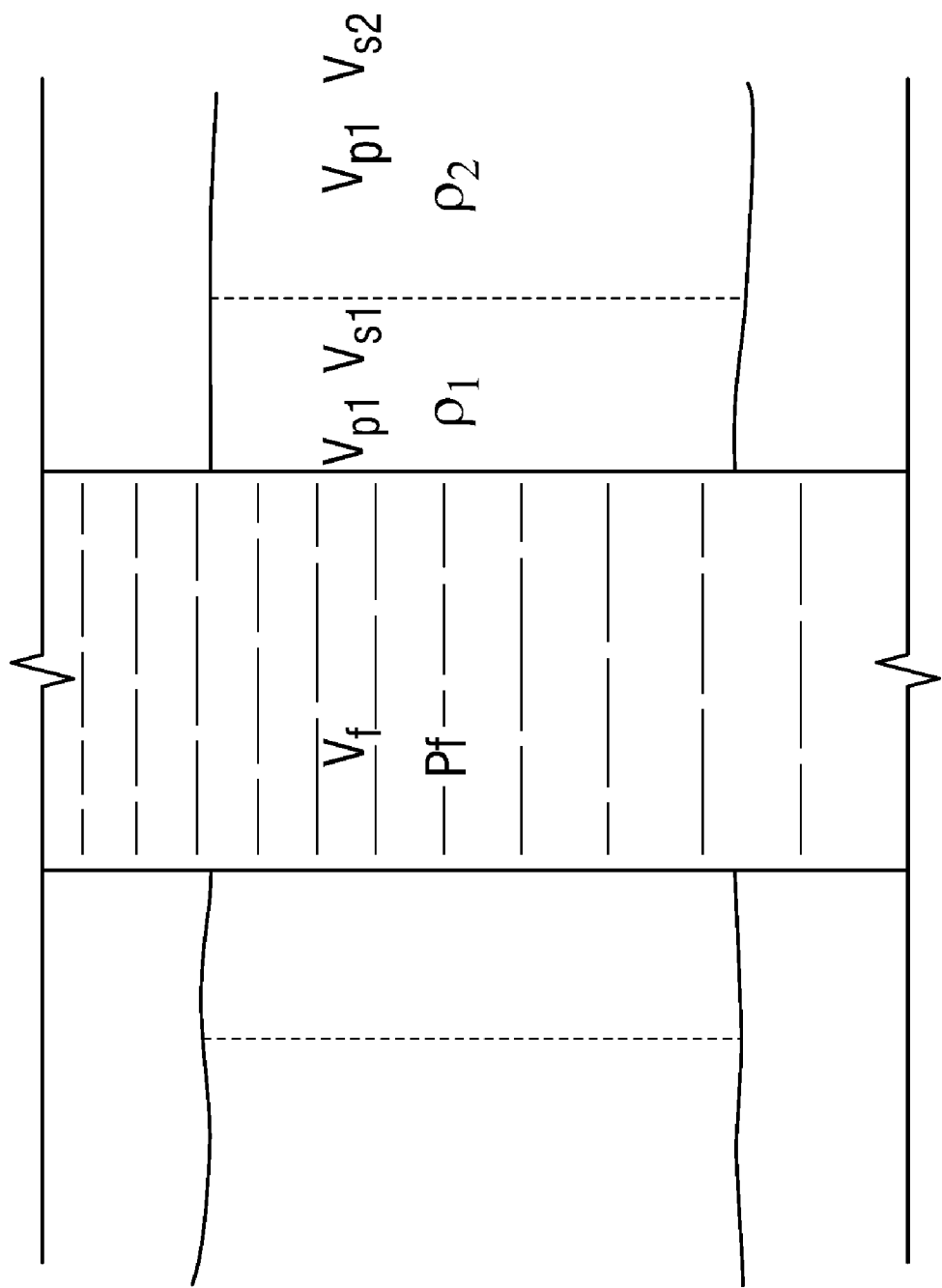
FIG. 3 shows two earth formations penetrated by the wellbore, the first having an altered zone and the second being unaltered.

For the present disclosure, a simple altered formation model shown in FIG. 3 is used to demonstrate the flexural wave propagation and dispersion characteristics associated with alteration. The model includes a borehole having a fluid of density $\rho_f$ and compressional wave velocity $V_f$. Adjacent to the borehole is an altered zone with compressional velocity, shear velocity and density of $V_{p1}, V_{s1}$ and $\rho_1$ respectively. Outside the altered zone, the formation properties are $V_{p2}, V_{s2}$ and $\rho_2$.

The model parameters are given in Table 1. In this model, a cylindrical alteration zone of 0.1 m thickness is placed between a fluid-filled borehole and virgin formation, with the altered and virgin formation shear velocity being $V_1$=2000 m/s and $V_0$=2300 m/s, respectively. We choose to model the shear velocity alteration only because the flexural wave is most sensitivity to shear.

TABLE I

Acoustic properties for the model of FIG. 3

|  | Vp | Vs | P | Radius |
| --- | --- | --- | --- | --- |
| Borehole fluid | 1500 |  | 1.000 | 0.1 |
| Altered zone | 4000 | 2000 | 2.5 | 0.2 |
| Formation | 4000 | 2300 | 2.5 | ∞ |

Figure 4:
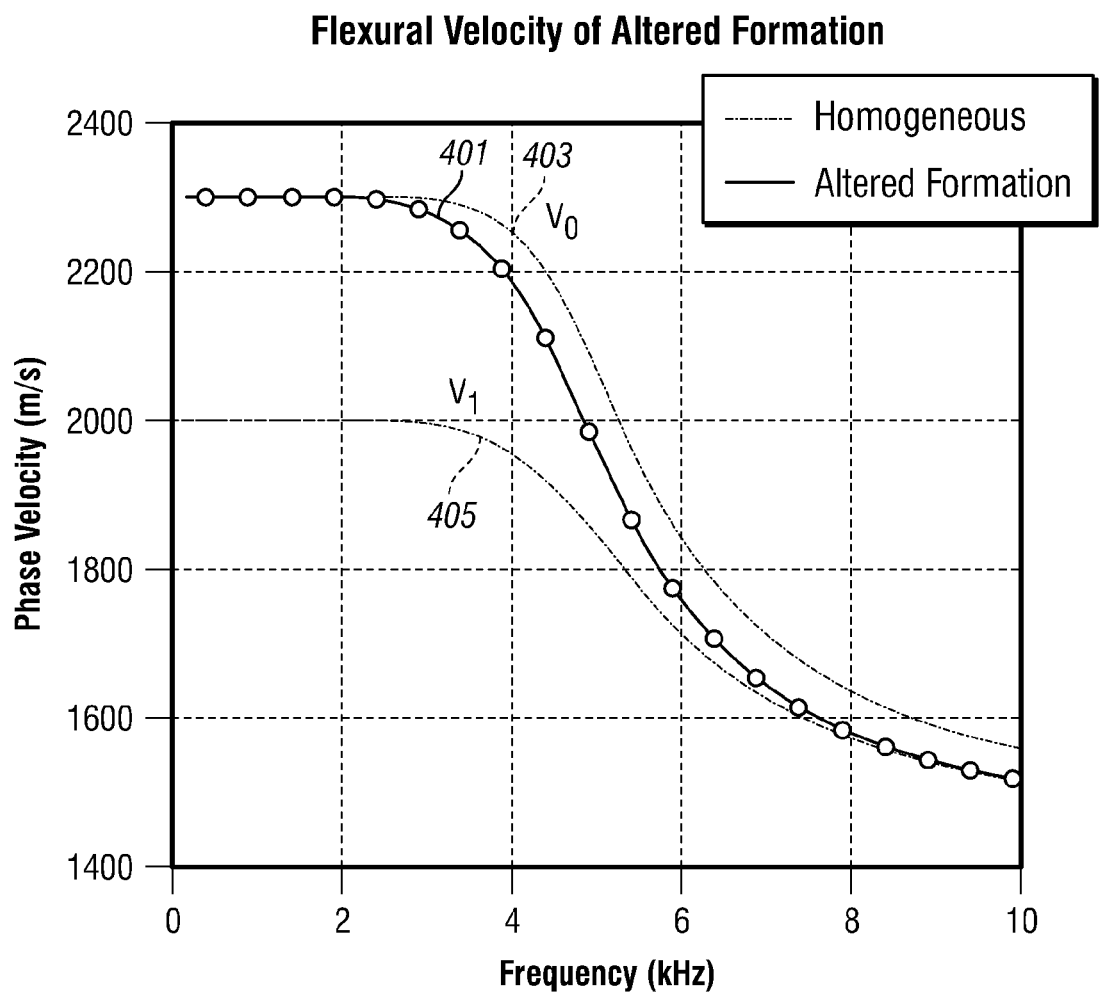
FIG. 4 shows the effect of formation alteration on the velocity of the flexural wave at the borehole.

FIG. 4 shows the flexural wave phase velocity dispersion curve 401 (with markers) for the model of TABLE 1 in the frequency range below 10 kHz, which covers the field dipole logging frequency range. The abscissa is frequency and the ordinate is the phase velocity. This curve is obtained by generating synthetic seismic traces similar to that in FIG. 2 for the model and analyzing the synthetic seismic traces using known methods to get the phase velocity as a function of frequency. For comparison, also plotted are dispersion curves of a homogenous formation (dashed curves) calculated with $V_0$=2300 m/s 403 and $V_1$=2000 m/s 405, respectively. For the homogenous formation, the flexural wave propagates with formation shear velocity at low frequencies. As frequency increases, the wave's velocity decreases and ultimately reaches the Scholte wave velocity for a planar fluid-solid interface at high frequencies (Tang and Cheng, 2004).

The comparison of the altered and homogenous formation dispersion curves reveals important and interesting characteristics of flexural wave propagation with an altered formation. At low frequencies, the long wavelengths allow the wave to penetrate deep into formation so that the wave's velocity reaches the virgin formation shear velocity $V_0$. As frequency increases, the wavelength shortens and the wave's sensing volume diminishes to the near borehole region, such that the wave's velocity is most sensitive to the altered zone velocity $V_1$. This is evidenced by the fact that the dispersion curve asymptotically approaches the homogeneous formation curve calculated with $V_1$. (Note this wave characteristic is utilized below to provide a constraint for the inversion.) From the above analysis, it is understood that the low- and high-frequency characteristics are closely related to the virgin and alteration shear velocity, respectively. It remains to show how the alteration zone thickness affects the dispersion characteristics in the medium frequency range between the low- and high-frequency limits. More importantly, it is desirable to find out whether the given dispersion curve data can be used to uniquely resolve both the size and amount of alteration, as will be discussed in the following section.

In this section, a sensitivity analysis for the simple model of FIG. 3 is performed and demonstrates that the inversion of alteration parameters (altered zone thickness and velocity) is highly non-unique even for this simple model. In the theoretical modeling of guided wave propagation in a borehole, sensitivity analysis is commonly used to analyze the importance of each model parameter in affecting the wave propagation. In the altered formation problem, the analysis is particularly helpful for demonstrating the effects of alteration on wave dispersion. The sensitivity is simply defined as the normalized partial derivative of the wave's phase velocity with respective to a model parameter p, as given by $$\text{Sensitivity} = \frac{p}{V(\omega)} \cdot \frac{\partial V(\omega)}{\partial p}. \tag{3}$$

Applying the sensitivity analysis to the model in FIG. 3, the sensitivity as a function of frequency for three important model parameters is obtained. The three model parameters are the virgin and altered formation shear velocity $V_0$ and $V_1$, and the altered zone outer radius $r_1$. For comparison, the sensitivity of $V_0$ and $V_1$ for the homogeneous formation scenario is also calculated. The results are plotted in FIG. 5 and discussed below.

The sensitivity to the virgin formation shear velocity 501 approaches unity toward low frequencies, which, compared to the homogenous formation cases 503, 505, shows that the low-frequency flexural wave with a deep penetration depth is mostly controlled by the virgin formation property. As frequency increases, the sensitivity of 501 diminishes and gives way to the sensitivity to $V_1$ 507. The latter sensitivity 507, small at low frequencies, increases to peak at a medium frequency and then approaches its homogenous formation counterpart 505 towards high frequencies. This means that, with decreasing wavelength at high frequencies, the wave's sensitivity is mostly controlled by the altered zone property.

Comparing the sensitivity curves of $V_1$ 507 and $r_1$ 509 reveals the root cause of non-uniqueness in the inversion of the altered zone parameters from dispersion data. Starting from zero values at low frequencies, the two sensitivity curves respectively reach a peak and trough in the medium frequency range, which is also the nominal frequency range of dipole acoustic logging. In this frequency range, the two sensitivity curves are anti-correlated, indicating that the change of dispersion by increasing the degree of alteration could be offset by reducing the alteration zone thickness. This analysis is substantiated by inverting the dispersion data to estimate the parameters $V_1$ and $r_1$.

The inversion is performed straightforwardly by minimizing the following cost function, constructed as the root-mean-square (rms) misfit error between model dispersion curve and given dispersion data.

$$E(\Delta r, \Delta V) = \sum_{\Omega} [V_m(\omega; \Delta r, \Delta V) - V_d(\omega)]^2 \tag{4}$$

where $\Delta r = r_1 - r_0$ and $\Delta V = V_0 - V_1$ are respectively the thickness and velocity change of the altered zone; $V_m$ is the model dispersion curve computed as a function of $\Delta r$ and $\Delta V$ by solving equation (1) and $V_d$ is the dispersion data to be fitted to. The misfit error is summed over the frequency range $\Omega$ where the dispersion data are given.

Figure 6:
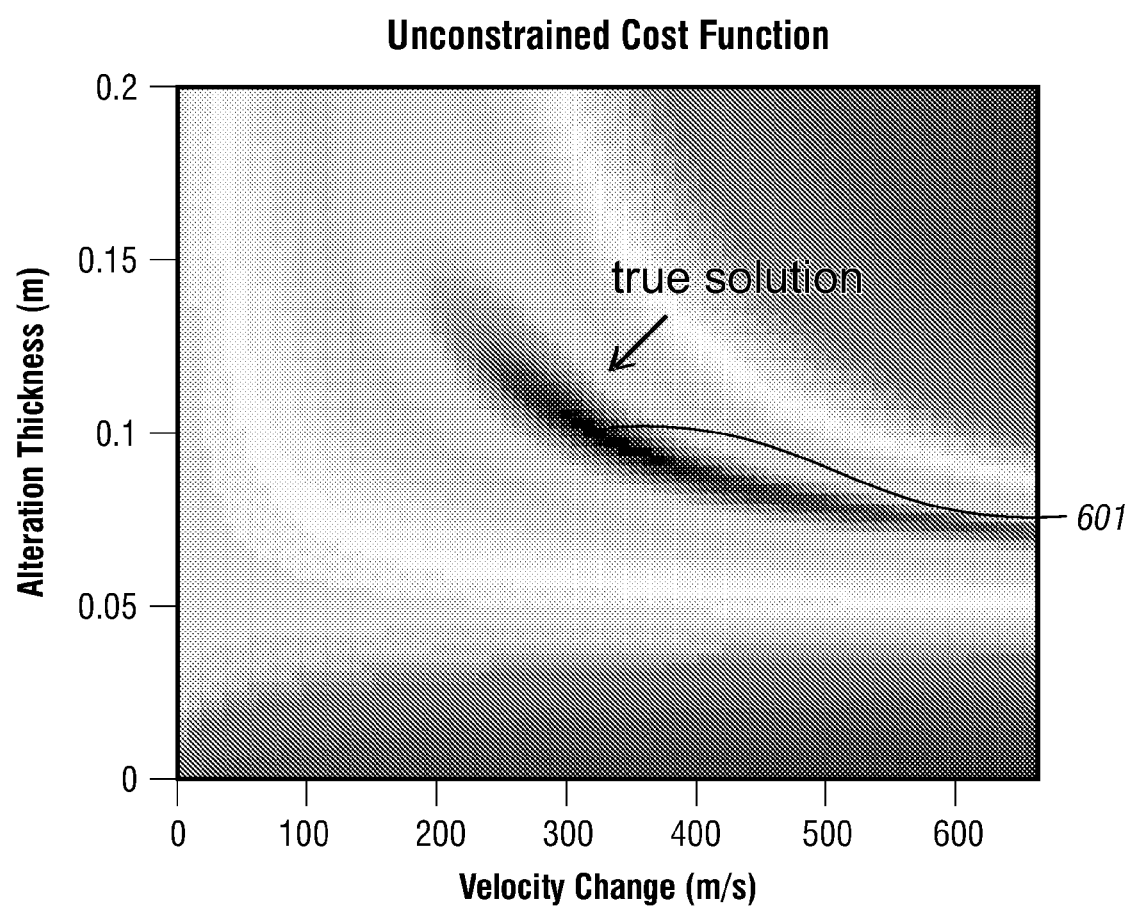
FIG. 6 shows a gray scale display of the unconstrained cost function of the misfit versus velocity and altered zone thickness.

Next, the parameters $\Delta r$ and $\Delta V$ are estimated from the inversion. The model in FIG. 3 with varying $r_1$ and $V_1$ is used to compute $V_m$, and the theoretical dispersion curve in FIG. 4 (solid curve corresponding to $\Delta r$=0.1 m and $\Delta V$=300 m/s) is used as the data $V_d$ in eqn. (4). The frequency range $\Omega$ is from 0 to 10 kHz. FIG. 6 shows a gray-scale display of $E(\Delta r, \Delta V)$ for the 2D domain of $0 \leq \Delta r \leq 0.2$ m (ordinate) and $0 \leq \Delta V \leq 500$ m/s (abscissa). A striking feature of this display is that the misfit function does not show an expected minimum around the true solution location 601. Instead, it shows a long valley that crosses the solution point. The function values along the valley are not substantially different. In fact, using any ($\Delta r$, $\Delta V$) pair along the valley to fit the dispersion curve in FIG. 4 will produce a good fit, with an average standard deviation about 10 m/s, which is about the size of the markers shown on the curve. The small fitting error is well below the measurement error in the field data and the simple inversion is therefore unable to determine which ($\Delta r$, $\Delta V$) pair along the valley is the best solution.

The display in FIG. 6 demonstrates the non-unique nature of the radial parameter inversion problem. The valley trajectory again shows the anti-correlation of the ($\Delta r$, $\Delta V$) parameters. That is, the change of dispersion characteristics could be produced either by a larger altered zone with a smaller velocity change, or by a smaller altered zone with a larger velocity change. In fact, the trajectory well resembles the trade-off curves of B-G inversion, as used in Burridge and Sinha (1996). Because of the non-uniqueness of the inversion, one has to trade off between resolving the detail of the radial shear velocity, as characterized by $\Delta r$, and the accuracy of the estimated velocity, as given by $\Delta V$.

From the non-uniqueness problem demonstrated for the simple one zone model, a more aggravated problem may be expected for the general case of a continuous radial velocity profile. By approximating the profile using multi-zone, staircase variations, it is seen that the problem is aggravated because, in addition to the non-uniqueness in the ($\Delta r$, $\Delta V$) estimation for each zone, it is necessary to resolve the contributions from multiple zones. To solve the non-uniqueness problem with a continuous velocity profile, the present disclosure includes a constrained inversion method, discussed next.

By adding a constraint as a priori information, the inversion process singles out from an infinite number of solutions (e.g., the case of FIG. 6) one solution that not only fits the data but also satisfies the constraint condition. Interestingly, the dispersion and sensitivity analysis curves shown in FIGS. 4 and 5, which were used to demonstrate the non-uniqueness problem, can also be used to provide the constraint information for solving the problem. The curves show that the radial shear velocity far from borehole corresponds to the low-frequency portion of the dispersion curve, while the velocity near the borehole wall controls the high-frequency portion of the curve. This suggests constraining the near-wall velocity using the high-frequency portion of the dispersion curve.

It can be seen that the altered zone dispersion curve (FIG. 4) and its corresponding sensitivity (solid curve marked 505 in FIG. 5) asymptotically approach their respective homogeneous formation counterparts computed using the near-wall shear velocity $V_1$. (In fact, at high frequencies, both dispersion curves will reach the Scholte wave velocity corresponding to $V_1$.) This high-frequency flexural wave characteristic is used to develop a constraint condition. For each trial value of $V_1$ in the iterative inversion process, the altered formation dispersion curve and a homogeneous formation dispersion curve are calculated. The constraint condition is set by matching the high-frequency portion of both curves. Adding the constraint to the cost function in equation (4), gives a constrained cost function.

$$E(\Delta r, \Delta V) = \sum_{\Omega} [V_m(\omega; \Delta r, \Delta V) - V_d(\omega)]^2 + \lambda \sum_{\Omega'} [V_m(\omega; \Delta r, \Delta V) - V_h(\omega; V_1)]^2 \qquad (5)$$

where $V_h(\omega;V_1)$ is the homogeneous formation dispersion curve computed using the near-wall velocity $V_1 = V_0 - \Delta V$; $\Omega'$ is a high-frequency range that contains at least one frequency point. The range of $\Omega'$ can be higher than $\Omega$. It can also be a subset of $\Omega$ towards its high-frequency end. The factor $\lambda$ is a weighting factor such that the constraint term in eqn. (5) has significant contribution to the cost function. In practice, $\lambda$ is chosen according to the size of $\Omega'$ relative to $\Omega$.

Figure 5:
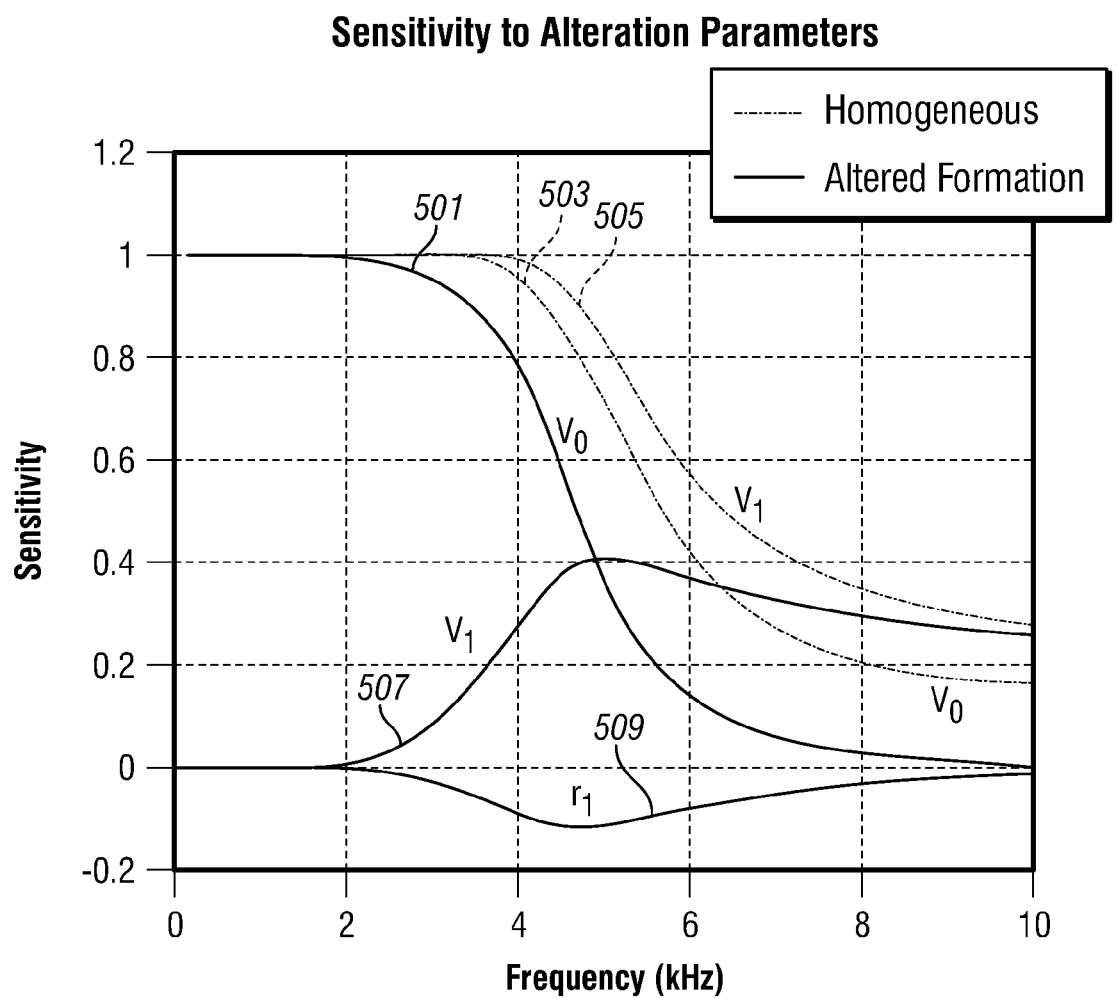
FIG. 5 shows results of a sensitivity analysis for the model of FIG. 4.
Figure 7:
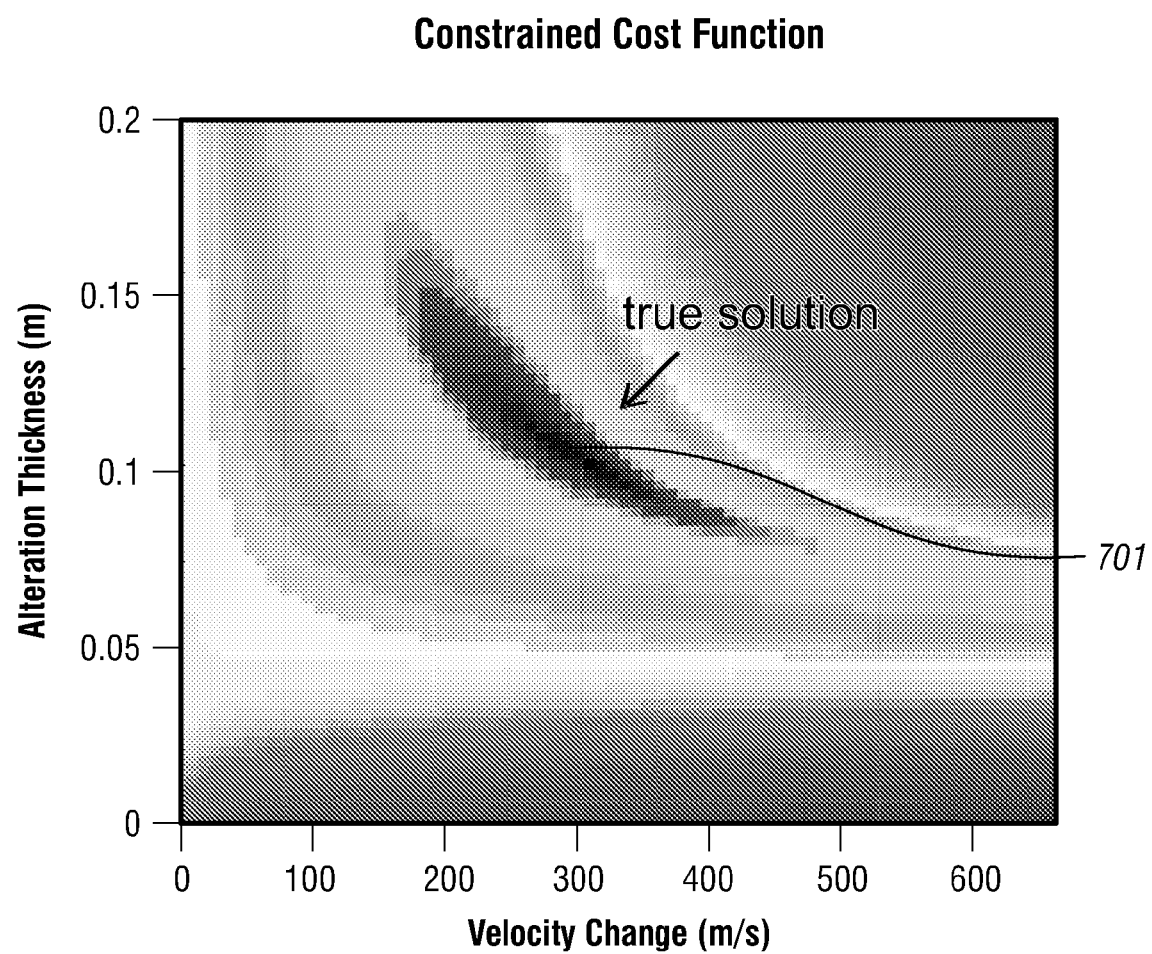
FIG. 7 shows a gray scale display of the constrained cost function of the misfit versus velocity and altered zone thickness.

Next, the effect of the constraint on the inversion is shown. The constrained cost function in eqn. (5) is computed in the same way as for the unconstrained case. In computing the constraint term, $\Omega'$ is set to 8-10 kHz and $\lambda=2$. FIG. 7 displays the gray-scale image of the cost function. A dramatic effect to notice is that the long valley in the unconstrained cost function (FIG. 6) is now replaced by a well defined minimum in the vicinity of the true solution point 701. Locating this minimum using a minimization algorithm (e.g., down hill simplex, Levenberg-Marquardt,) gives $\Delta V=285$ m/s and $\Delta r=0.105$ m. The estimated parameter values are about 5% different from their true values. This happens because the dispersion data in constraint frequency range $\Omega'$ is still (minimally) sensitive to $\Delta r$ and $V_0$ (FIG. 5). The true values can be accurately recovered from the exact synthetic data if we shift $\Omega'$ to a very high frequency range (>20 kHz or higher). In practice, however, this would add a computational burden to the iterative inversion process. Considering data error and other uncertainties in field data applications, the constraint scheme and the inversion result are quite satisfactory.

Next, the inversion method is applied to the more realistic situation of a continuous radial velocity profile. After drilling through an earth formation, the radial property change near a borehole is usually caused by drilling damage at the borehole wall, stress concentration around borehole, and fluid invasion into formation, etc. It is thus anticipated that a drastic property change, if any, would most likely occur close to the borehole wall. It is also reasonable to assume that the property change is monotonic, either increasing or decreasing away from the borehole. Inverting complicated radial changes, e.g., oscillatory variations, is impractical, if not impossible. The term "monotonic" is to be given its common usage definition: "having the property either of never increasing or of never decreasing as the values of the independent variable or the subscripts of the terms increase."

In view of the above discussions, a simple radial shear velocity profile model is used that not only captures the near-borehole change, but also allows makes it possible apply the developed constrained inversion method. This model is given by $$V(r) = V_0 - \Delta V \cdot \exp\left(-\frac{r - r_0}{\Delta r}\right), \quad (r \geq r_0) \qquad (6)$$

where $r_0$ is borehole radius, and $V_0$ is the virgin formation velocity in the far borehole region. At borehole wall ($r=r_0$), the velocity is $V_1=V_0-\Delta V$. Away from borehole, the velocity change is governed by two parameters, $\Delta r$ and $\Delta V$. Fast changes are modeled by small values of $\Delta r$ and slow changes are modeled by large values of $\Delta r$. The $\Delta V$ parameter not only controls the amount of alteration, but also dictates whether the profile increases ($\Delta V > 0$) or decreases ($\Delta V < 0$) away from borehole. The simple profile model should therefore model a monotonic profile change quite well. Note the model can also be related to the simple one-zone model of FIG. 1. Integrating the varying part of the profile (second term of eqn. (6)) from $r_0$ to $\infty$, the result is $\Delta V \cdot \Delta r$. In terms of the one-zone model, this is simply the product of velocity change and the zone thickness. Therefore, $\Delta V$ can be considered as the average amount of alteration, and $\Delta r$ can be considered the average size of an "equivalent" alteration zone. The advantage of the current model is that, while maintaining the minimum number of model parameters, it allows for modeling the continuous profile change away from borehole. The choice of this exponential function for the velocity model is not intended to be a limitation, and any monotonic function could be used.

The constrained inversion formulation (eqn. (5)) is applied to the profile model (eqn. (6)) in a straightforward manner. For the constraint condition, a homogeneous formation dispersion curve is used. However, the shear velocity of the "homogeneous" formation needs to be defined for the variable formation model. As an approximation, the near-wall shear velocity is defined as follows.

$$\overline{V_1} = \frac{1}{\Delta r} \int_{r_0}^{\eta} V(r)\, dr = V_0 - \Delta V(1 - e^{-1}) \qquad (7)$$

Note this velocity is not the borehole-wall velocity $V_1=V_0-\Delta V$, but is the average velocity within the "equivalent" alteration zone of thickness $\Delta r$, which corresponds to the sensitive volume of the high-frequency waves. For each trial value of $\Delta V$ in the inversion process, we use the "homogeneous formation" dispersion curve to constrain the high-frequency portion of the altered formation dispersion curve. The latter dispersion curve should now be computed with the radial profile given in eqn. (6). By constraining the near- and far-borehole velocity with the high- and low-frequency portion of the dispersion curve, the parameter $\Delta r$, which affects the change of dispersion in the medium frequency range, can be uniquely determined. The validity of the simple profile model, together with the constrained inversion procedure, will be tested with theoretical profile curves from stress-induced alteration modeling.

To validate the above developed constrained inversion method, the method is used to estimate the shear velocity profile resulting from stress concentration around borehole. Stress-induced near-borehole velocity change and anisotropy are an important topic for cross-dipole shear-wave logging and have been studied by many authors. The term "cross-dipole" is used to refer to data acquired using two different transmitter polarizations and two different receiver polarizations. The two polarizations are typically orthogonal to each other. Because of the stress concentration due to an unbalanced stress field around borehole, shear velocity changes drastically in both azimuthal and radial directions. Of particular interest is the radial shear velocity profile along maximum and minimum stress directions (e.g., FIG. 5 for a 1-D variation). The above discussed B-G inversion technique has also been applied to estimate the shear velocity profile (Sinha et al., 2005). The stress-relate shear velocity profile provides a test for the constrained inversion method developed in this study.

Figure 8:
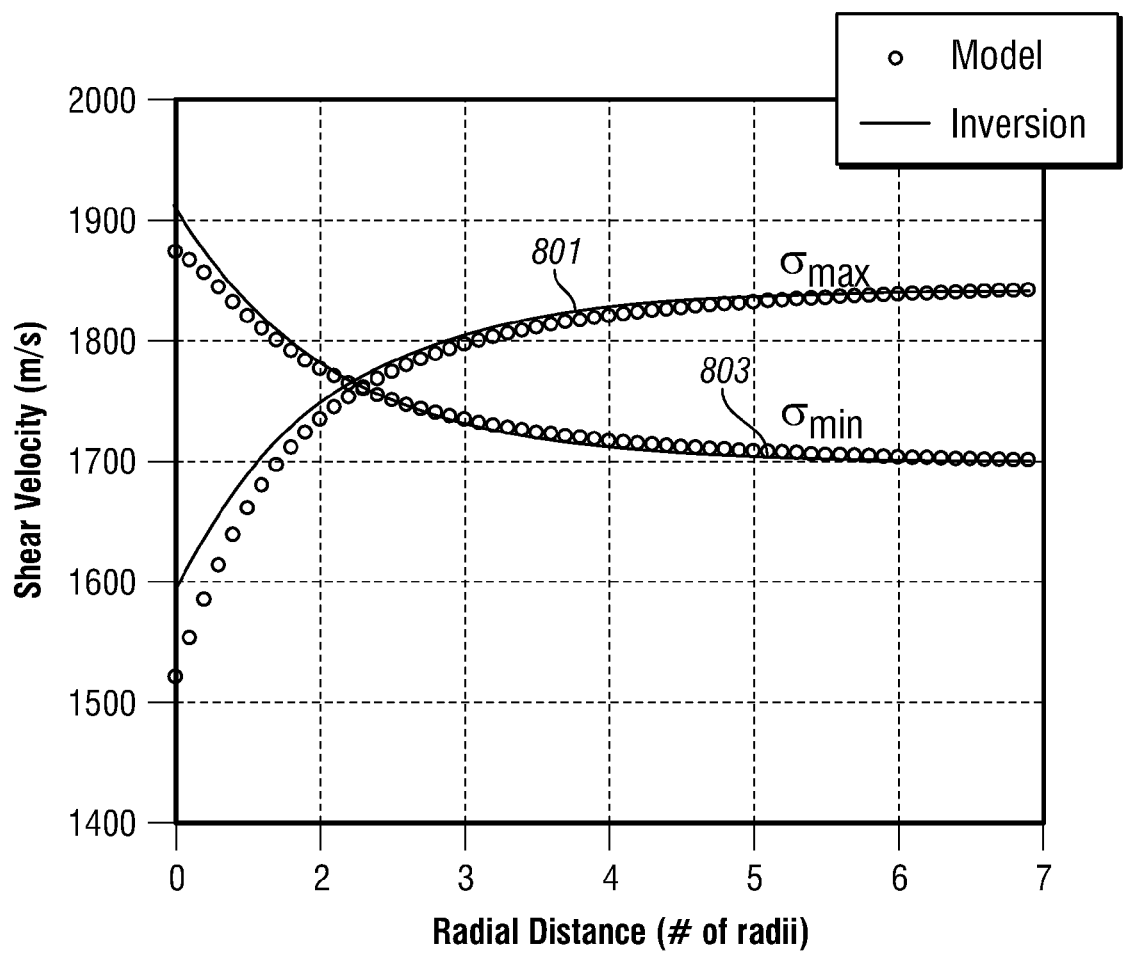
FIG. 8 shows model of stress-induced near-borehole shear velocity profile along maximum and minimum stress directions.
Figure 9:
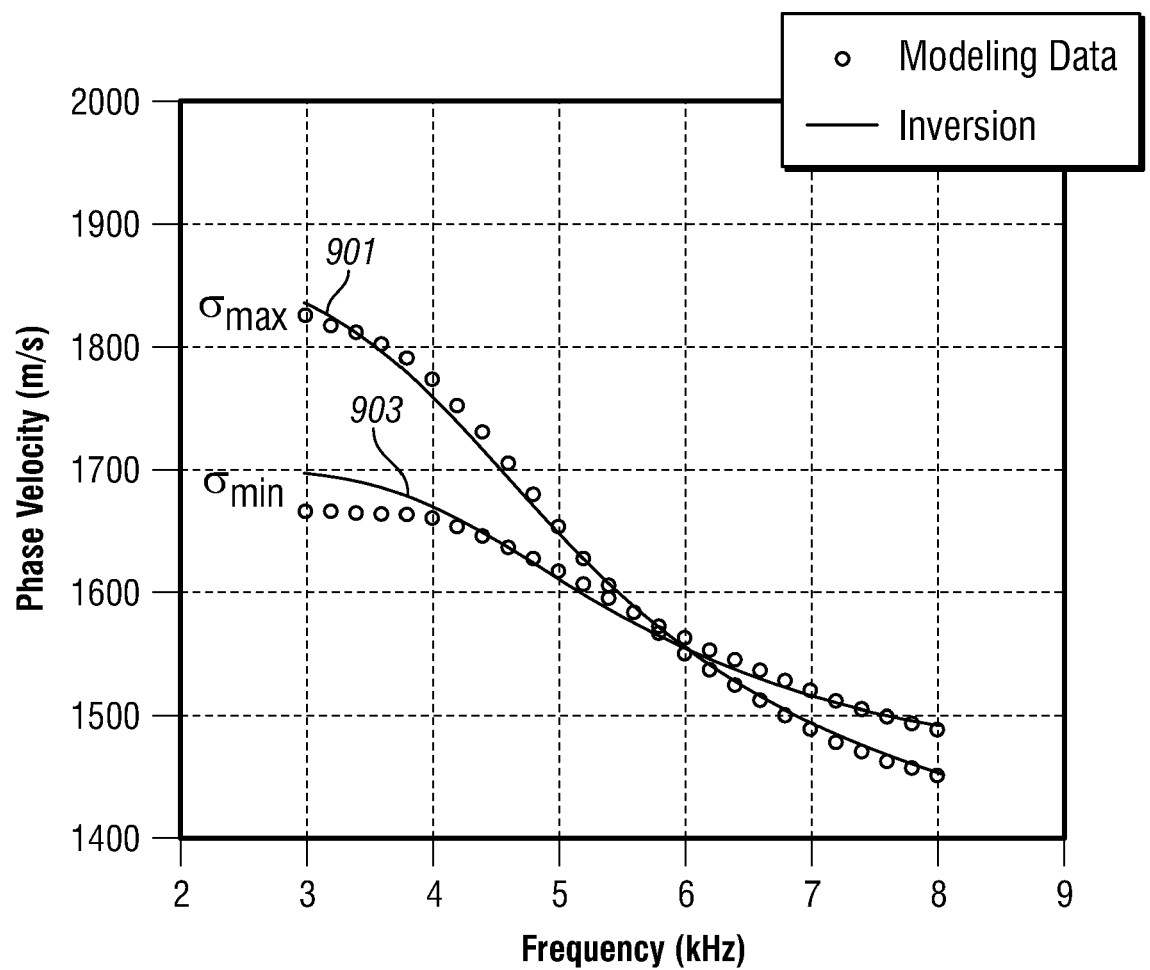
FIG. 9 shows the flexural wave dispersion curves along maximum and minimum principal stress directions for the shear velocity profiles of FIG. 8.

A published theoretical modeling data set (Wang and Tang, 2005) is used for the test. FIG. 8 shows the radial shear velocity profiles (markers) along the maximum and minimum stress directions, denoted by $\sigma_{max}$ and $\sigma_{min}$, respectively. The profiles are calculated for a 20.3-cm diameter, water-filled borehole subjected to a 10 MPa unbalanced stress. (Detailed model parameters and calculation results are given in Wang and Tang, 2005.) Due to stress concentration, the near-borehole velocity is significantly lower along the $\sigma_{max}$ direction than along the $\sigma_{min}$ direction. Away from borehole, the two profiles cross each other and reach their respective far-borehole limits. The cross-over of the radial shear profiles results in the cross-over of the flexural dispersion curves for the two directions, as shown in FIG. 9 (markers). The solid curves are inversion fitted theoretical dispersion curves corresponding to the profiles of FIG. 8. The dispersion data in FIG. 9 are calculated from the synthetic dipole-shear waveform data for the maximum and minimum stress directions, as denoted by $\sigma_{max}$ and $\sigma_{min}$, respectively. These are derived from synthetic cross-dipole shear wave data simulating measurements made by a cross-dipole logging tool.

At low frequencies, the deep penetrating dipole wave measures a faster velocity in the $\sigma_{max}$ direction and a slower velocity in the $\sigma_{min}$ direction. As frequency increases, the wave's sensitive volume diminishes to the near borehole region, such that the wave's velocity is slower in the $\sigma_{max}$ direction than in the $\sigma_{min}$ direction, resulting in the cross-over of the dispersion curves in the medium frequency range. Of particular interest for this study is whether the new inversion method can recover the radial shear profiles form the dispersion data.

The dispersion data for the two stress directions are respectively inverted using the constrained inversion formulism (eqn. (5)) and the variable velocity model (eqn. (6)). The constraint "homogeneous" formation dispersion curve is calculated with the velocity specified by eqn. (7). Other model parameters needed for calculating the theoretical dispersion curves from eqns. (1) and (2) are given in Wang and Tang (2005). After the inversion, the best fitting dispersion curves for the two data sets are displayed as solid curves in FIG. 9. In general, the theoretical curves fit the data quite well, although a noticeable misfit is seen towards the low-frequency end of the $\sigma_{min}$ data set, where the fitting curve approaches the correct low-frequency limit while the data shows a small discrepancy. The estimated radial profiles are displayed as solid curves in FIG. 8 to compare with the respective model profiles. The inverted profile curves capture the general increasing/decreasing trend of the model profile curve and fit the data quite well. The largest discrepancy is at the borehole wall, where the velocity changes along the maximum and minimum stress directions are respectively under- and over-estimated. The discrepancy (and the discrepancy in FIG. 8) could be caused by the respective approximation and numerical errors in the data modeling and inversion calculations. The dispersion data is calculated from finite difference wave simulation of the 3D velocity model that is both inhomogeneous and anisotropic (Wang and Tang, 2005). Whereas the inversion uses the simple 1D velocity model (eqn. (6)) to approximate the 3D anisotropic model in its principal directions. Despite the discrepancy, the results in FIGS. 8 and 9 demonstrate that the simple variable velocity model (eqn. (6)) is quite adequate for modeling the stress-induced monotonic velocity variation and the constrained inversion estimates the radial changes reasonably well.

The above described inversion method has been applied to processing dipole waveform data acquired from acoustic logging of oil-field wells. The waveform data can be the single component data from conventional dipole shear-velocity logging, or the full four-component data set from cross-dipole acoustic logging. For the single-component data, the formation is assumed isotropic with no azimuthal changes because the data alone can not resolve the changes. The dipole shear wave measurement, however, is most sensitive to the formation shear property along the wave's polarization direction. This directional sensitivity is utilized in cross-dipole logging to determine azimuthal shear wave anisotropy. The same directional sensitivity can also be utilized to determine azimuthal changes of the radial shear profile.

Figure 10:
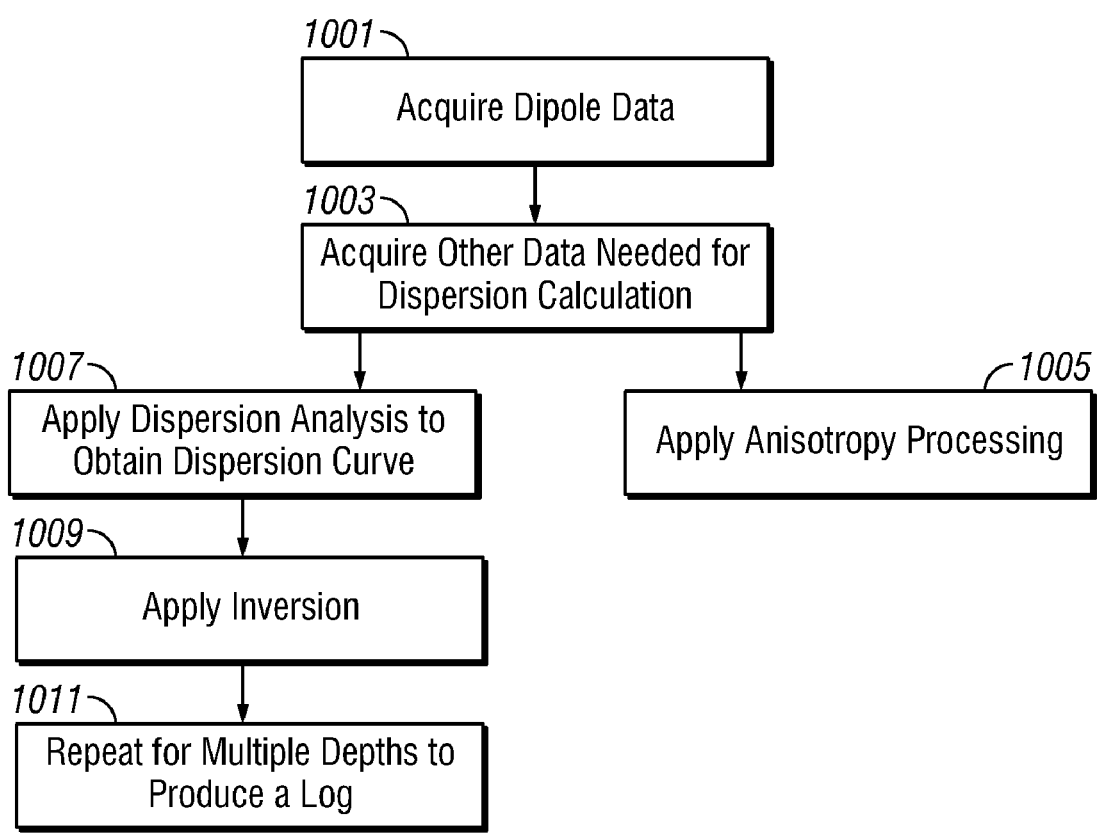
FIG. 10 is a flow chart illustrating some steps of a method of processing the data.

For an anisotropic formation, the four-component data can be rotated to any azimuthal direction to obtain a dipole wave polarizing at that direction. Processing the dipole data yields the radial variation along the direction. In particular, the four-component data can be rotated to the two principal directions of the anisotropy, which correspond, respectively, to the fast and slow shear wave polarization direction, as obtained from cross-dipole processing (e.g., Tang and Chunduru, 1999). Processing the dipole data for each direction yields the radial profiles of the two directions. (An example has been illustrated for the synthetic data of FIG. 6.) The general data processing procedure for the inversion method is summarized below in FIG. 10.

The process starts with acquiring data 1001. The data may be conventional dipole data or may be cross-dipole acoustic data. Other data needed for calculation of the theoretical dipole-flexural dispersion curves are obtained 1003. These data include formation compressional and shear velocities, density, and borehole caliper data, which, together with borehole fluid acoustic property, will be used to calculate theoretical dipole-flexural wave dispersion curves.

In case of four-component cross-dipole data, anisotropy processing (e.g., Tang and Chunduru, 1999) is applied to data 1005 to obtain fast and slow shear wave polarization directions. The four-component data are rotated to these two directions to yield fast and slow flexural wave data. Dispersion analysis is obtained to get the dispersion curves for each of the two directions 1007. In case of single-component dipole data, dispersion analysis is applied (e.g., Tang and Cheng, 2004) to obtain dispersion curve data for the frequency range of the data (normally between 0.5 to 8 kHz) without rotating into the fast and slow directions 1007. For dispersion data from either the single-component data or from the four-component data, the inversion method as described by eqn. (6) 1009 is applied to obtain formation radial alteration parameters. For the inversion procedure, selected trial values of alteration parameters (i.e., $\Delta r$ and $\Delta V$, as from eqn. (6) and other parameters from 1003 are used to calculate a theoretical dispersion curve for an altered formation and a theoretical dispersion curve for a homogeneous formation. (The shear velocity of the latter formation is given by eqn. (7)). The altered formation curve are used to fit the dispersion data and constrained by fitting its high-frequency portion with that of the homogeneous formation curve, as dictated in eqn. (6). The trial parameter is iterated till the misfit function of eqn. (5) attains a minimum. Output the parameter values at the minimum and use them in eqn. (6) to calculate the radial shear velocity profile for one depth. The above procedure is repeated for the entire depths of the logged well 1011. Continuously displaying the radial profile of each depth obtains the radial profile of the well.

A data application example (FIG. 11) is used to demonstrate the results of the above procedure. The results are shown for a 50-m depth interval across a sandstone formation.

The gamma ray 1101 and caliper log 1103 curves are shown in track 1. The gamma ray curves shows that the lower portion of the sand is clean with increasing shaliness towards top. The borehole is in good condition averaging about 10-in (25.4 cm). A good quality cross-dipole data was acquired for the depth section, yielding a reliable shear-wave anisotropy log (averaging 10%, shaded curve in track 4) and well defined fast 1105 and slow shear polarization 1107 directions (respectively shown as rose diagrams in tracks 2 and 6). Rotating the four-component data to the two directions (Alford 1986) gives fast 1109 and slow flexural wave 1111 data shown in tracks 2 and 6, respectively. (Only data from receiver 1 of an eight receiver array is shown.) The lines in these two tracks are the travel time of the fast wave. The delay of the slow wave relative to the fast travel time is an evidence of anisotropy, which confirms the anisotropy result 1115 of track 4 and supports the validity of the rotation.

The radial shear velocity estimation and results are now discussed. (Note in the following text, the term "slowness" is used instead of velocity to follow the convention of well logging community.) The fast and slow wave data are respectively processed to provide dispersion data for the inversion. (An example of the data for one depth is shown in FIG. 12.) Inverting the data using the above procedure obtains the radial shear slowness profiles for the two directions. The profiles are plotted using a color image display in tracks 3 1117 and 5 1119 of FIG. 11, respectively, and show the radial variation in velocity in the formation away from the borehole. The fast direction profile image shows significant near borehole changes (dark area) in the sand while the slow direction image is relatively homogeneous. The substantial radial profile image difference in these two directions demonstrates that the inversion processing can distinguish azimuthal changes of the shear radial profile. The cause of the difference, however, remains to be explained. The fast and slow direction slowness dispersion data and the radial shear slowness profiles for a depth in the central part of the sand, as indicated by an arrow, are displayed in FIGS. 12 and 13 for further discussion.

Figure 11:
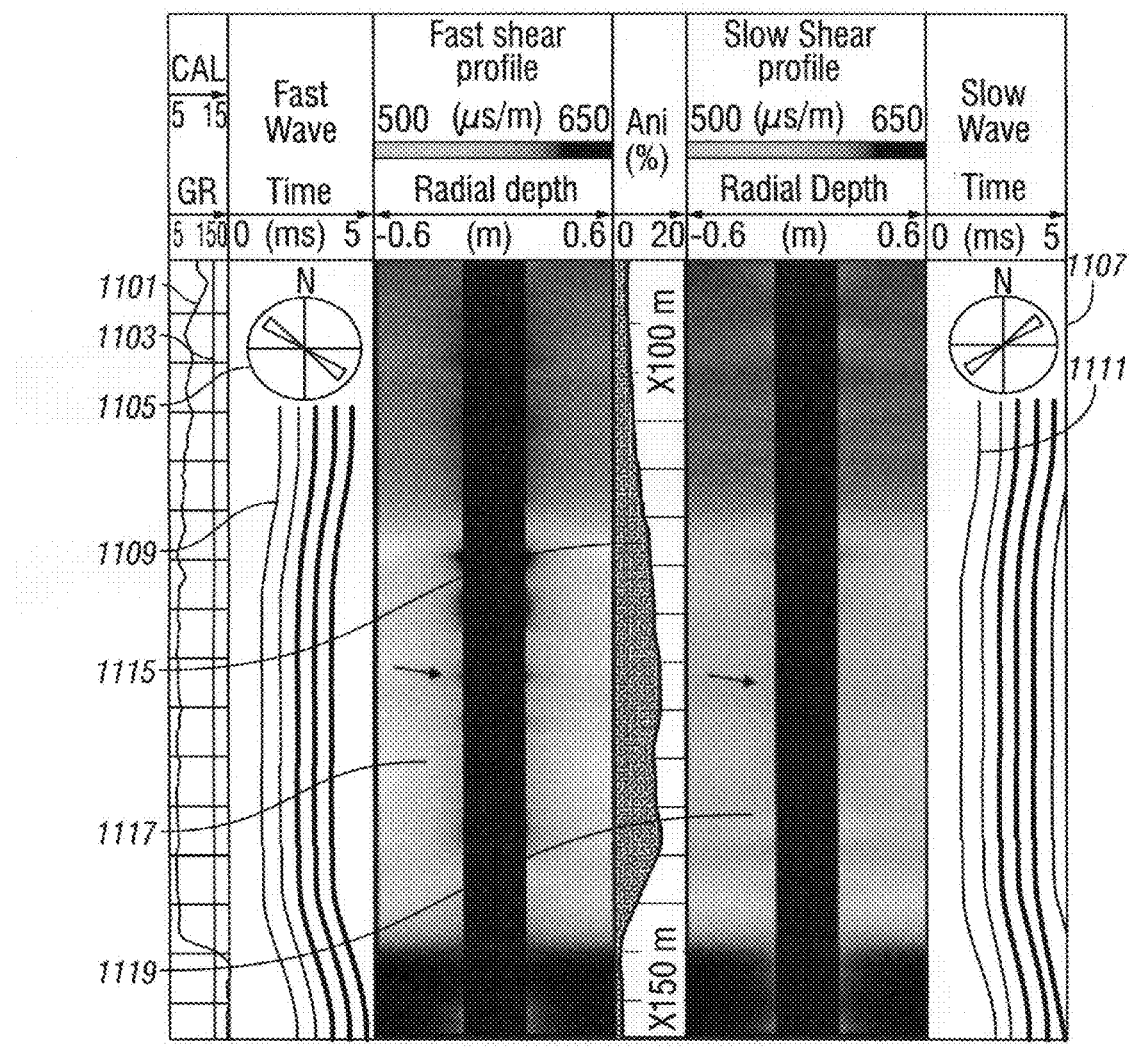
FIG. 11 shows exemplary cross-dipole data from a well used to illustrate the method of the present disclosure.
Figure 12:
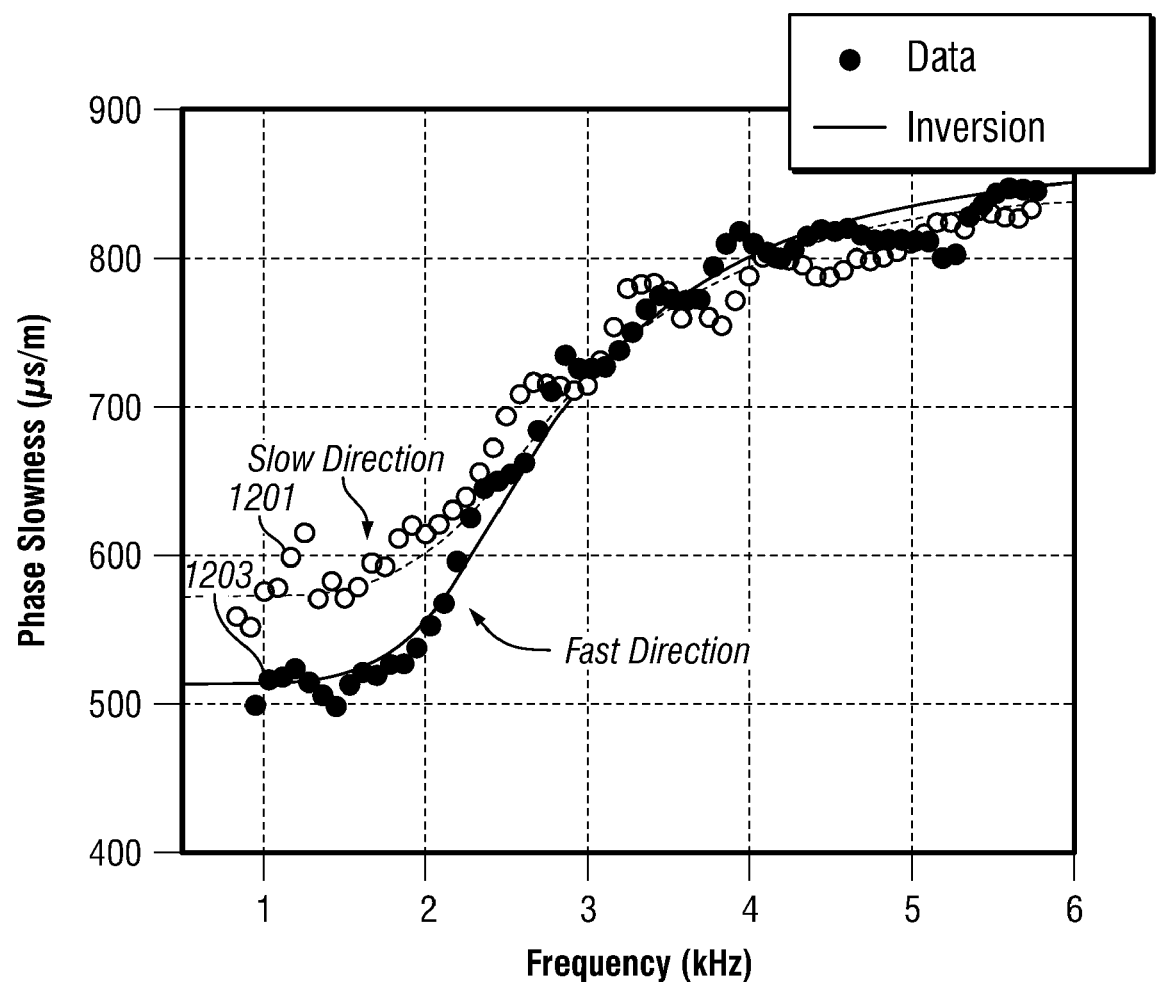
FIG. 12 shows the flexural wave dispersion data along the fast and slow shear polarization directions for the data of FIG. 11.

The low-frequency (1-2 kHz) dispersion data of the fast 1203 and slow 1201 directions (solid and open circles) show significant difference, which corresponds to the measured anisotropy in track 4 of FIG. 11. As frequency increases, the two groups of data merge around 3-4 kHz in FIG. 12. At even higher frequencies, the slow direction data tend to become faster than the fast direction data. Compared to the theoretical example in FIG. 9, the data trends resemble those of the stress-induced scenario. However, the high-frequency separation of the two data groups is much smaller than the theoretical case. Indeed, the measured shear wave anisotropy is stress-induced, as supported by two evidences: 1) the fast shear orientation coincides with the maximum stress direction of the region and 2), stress-induced anisotropy is strong in (stress-sensitive) sand and decreases with increasing shaliness (decreasing stress sensitivity), as supported by the anti-correlation between gamma-ray and anisotropy log curves. See 1101, 1115 in FIG. 11. The estimated slowness profiles (FIG. 13) provides an explanation for the dispersion data trends.

Figure 13:
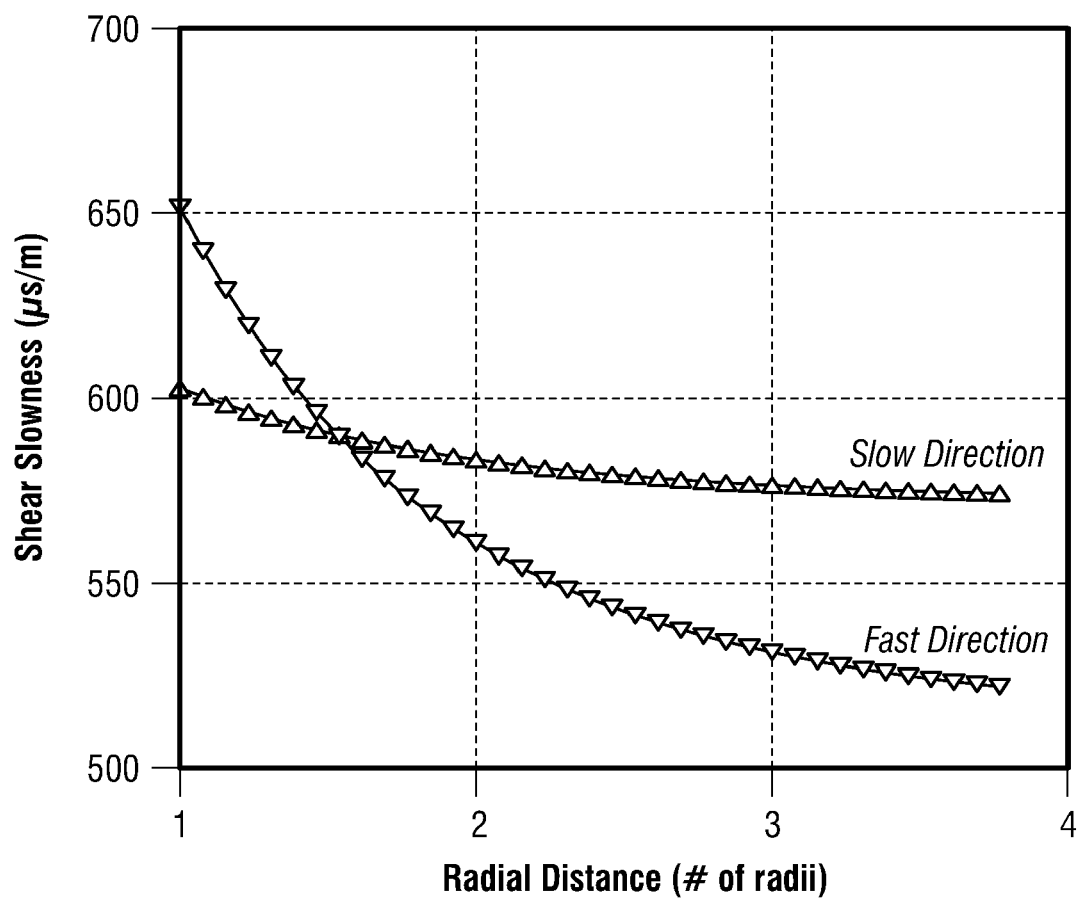
FIG. 13 shows the estimate slowness profile for the fast and slow polarization directions.

The near-borehole portion of the radial slowness profile in FIG. 13 shows a significant increase for the fast direction, and a slight increase in the slow direction, in contrast to the theoretical example of FIG. 8, where the slow direction velocity increases (slowness decreases) substantially towards borehole wall. The small near-borehole difference of the two profiles explains the small dispersion curve separation at high-frequencies, as exhibited from both the field data and the theoretically-fitted dispersion curves (solid and dashed curves in FIG. 12) that are computed from the shear profiles. Interestingly, the trend of the field shear profiles is in agreement with the theoretical prediction of Sayers et al. (2008). They showed that the concentration of near-wall compressive stress in the slow shear direction may cause the yield of a porous sandstone rock, resulting in increasing, instead of decreasing, of the shear slowness towards the borehole wall. In this regard, delineating the shear radial profile and its azimuthal variation enables a determination of the mechanical properties of the rock around the borehole, providing useful information for reservoir production optimization.

Figure 14:
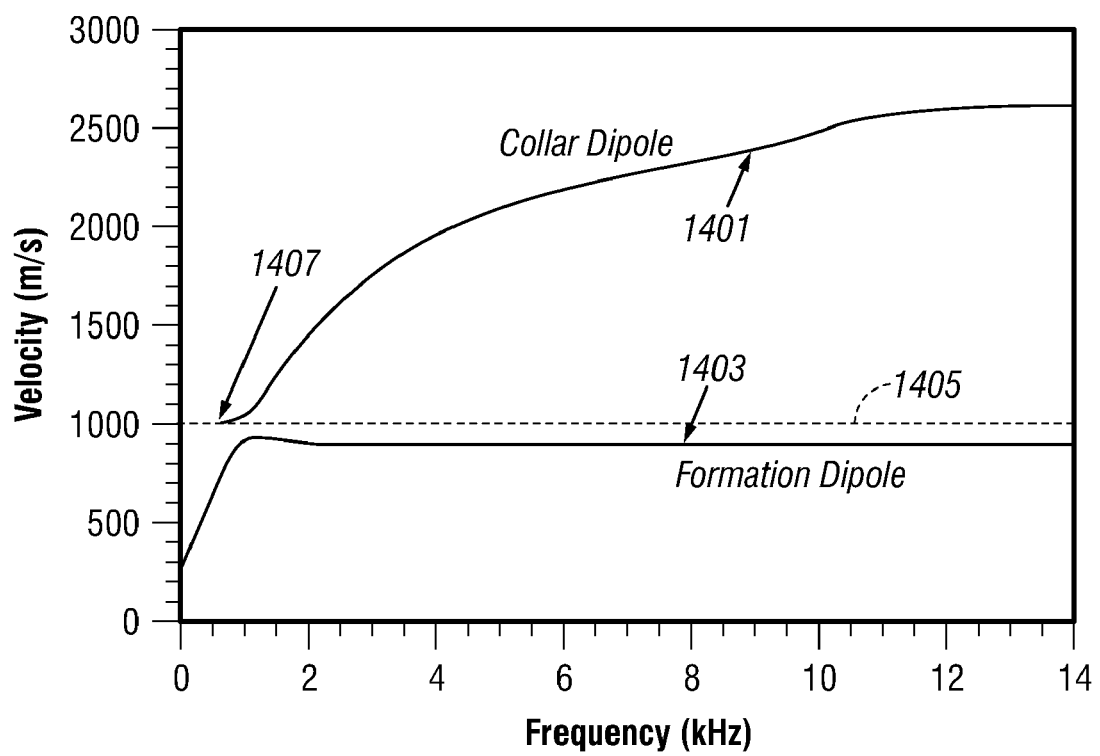
FIG. 14 (prior art) shows a dispersion curve for dipole waves in a MWD environment.

The discussion above has been with respect to measurements made using a wireline tool in a borehole. The method may also be used in a measurement-while-drilling embodiment. FIG. 14 shows the dispersion curves for an MWD tool in a borehole. The carrier in this case is a bottomhole assembly conveyed on a drilling tubular. Shown are the dispersion curves for a dipole wave propagating in the formation 1403, the shear velocity of the formation 1405 and the dipole wave in the drill collar 1401. As discussed in U.S. Pat. No. 6,850,168 to Tang et al., formation shear velocity cannot be determined by measuring the formation mode velocity due to interference with the collar mode signal 1401. The collar mode dispersion curve depends on the shear velocity of the drill collar, the tool radius and the borehole radius, but it also depends upon the altered zone in the formation. Hence the dispersion analysis discussed above can be used to estimate a radial shear velocity profile in the formation. The formation shear velocity necessary for the inversion can be obtained using a quadrupole source as discussed in Tang.

It should be noted that for the MWD embodiment, the constrained inversion methodology can be applied to any dispersion modes in MWD: dipole, quadrupole, or leaky-P. The general physics behind is that high-frequency portion of the wave's dispersion curve will sense the near-well region, which thus be used as a constraint for constraining the wave's dispersion curve for an altered formation.

The processing of the data may be done by a downhole processor and/or a surface processor to give corrected measurements substantially in real time. Implicit in the control and processing of the data is the use of a computer program on a suitable machine readable medium that enables the processor to perform the control and processing. The machine readable medium may include ROMs, EPROMs, EEPROMs, Flash Memories and Optical disks. Such media may also be used to store results of the processing discussed above.

What is claimed is:

1. A method of evaluating an earth formation, the method comprising:
    using a carrier for acquiring acoustic dipole data in a borehole; and
    using a processor for:
    processing the acquired acoustic dipole data to estimate a dispersion curve of at least one shear wave in the earth formation; and
    performing a constrained inversion of the dispersion curve, estimated from the acquired acoustic dipole data, of the at least one shear wave to estimate a radial shear velocity profile of the earth formation.

2. The method of claim 1 wherein:
    acquiring the acoustic dipole data further comprises acquiring cross-dipole data,
    estimating the dispersion curve of the at least one shear wave further comprises estimating the dispersion curve of a shear wave in a fast direction and a shear wave in a slow direction; and estimating the radial shear velocity profile further comprises estimating a radial shear velocity profile in the fast direction and a radial shear velocity profile in the slow direction.

3. The method of claim 1, wherein the constrained inversion is performed using a velocity model in which the radial shear velocity profile changes monotonically with distance from the borehole.

4. The method of claim 3, wherein the constrained inversion is performed using the velocity model in which the radial shear velocity profile changes exponentially with distance from the borehole.

5. The method of claim 1 wherein performing the constrained inversion further comprises minimizing a constrained cost function that depends upon a homogenous formation dispersion curve computed using a near-wall velocity.

6. The method of claim 2 further comprising using the estimated radial shear velocity profile in the fast direction and the estimated shear velocity profile in the slow direction to identify a stress in the formation.

7. The method of claim 1 further comprising acquiring the acoustic dipole data using a carrier conveyed on one of a wireline, and a drilling tubular.

8. The method of claim 1 further comprising optimizing reservoir production using information resulting from performing the constrained inversion using the estimated radial shear velocity profile.

9. An apparatus for evaluating an earth formation, the apparatus comprising:
a carrier configured to acquire acoustic dipole data in a borehole, and
at least one processor configured to:
process the acquired acoustic dipole data to estimate a dispersion curve of at least one shear wave in the earth formation; and
perform a constrained inversion of the dispersion curve, estimated from the acquired acoustic dipole data, of the at least one shear wave to estimate a radial shear velocity profile of the earth formation.

10. The apparatus of claim 9 wherein:
the carrier configured to acquire acoustic dipole data is further configured to acquire cross-dipole data, and
wherein the at least on processor is further configured to:
estimate the dispersion curve of the at least one shear wave by further estimating a dispersion curve of a shear wave in a fast direction and dispersion curve of a shear wave in a slow direction; and
estimate the radial shear velocity profile by further estimating a radial shear velocity profile in a fast direction and a radial shear velocity profile in a slow direction.

11. The apparatus of claim 9, wherein the constrained inversion is performed using a velocity model in which the radial shear velocity profile changes monotonically with distance from the borehole.

12. The apparatus of claim 1, wherein the constrained inversion is performed using the velocity model in which the radial shear velocity profile changes exponentially with distance from the borehole.

13. The apparatus of claim 9 wherein the at least one processor is configured to perform the constrained inversion by minimizing a constrained cost function that depends upon a homogenous formation dispersion curve computed using a near-wall velocity.

14. The apparatus of claim 10 wherein the at least one processor is further configured to use the estimated radial shear velocity profile in the fast direction and the estimated shear velocity profile in the slow direction to identify a stress in the formation.

15. The apparatus of claim 9 further comprising one of: a wireline, and a drilling tubular, configured to convey the carrier into the borehole.

16. The apparatus of claim 9, wherein the at least one processor is configured to optimize reservoir production using information resulting from performing the constrained inversion using the estimated radial shear velocity profile.

17. A non-transitory computer-readable medium product having stored thereon instructions that when read by at least one processor cause the at least one processor to execute a method, the method comprising:
processing acoustic dipole data acquired in a borehole to estimate a dispersion curve of at least one shear wave in the earth formation; and
performing a constrained inversion of the dispersion curve, estimated from the acoustic dipole data, of the at least one shear wave to estimate a radial shear velocity profile of the earth formation.

18. The computer-readable medium of claim 17 further comprising at least one of: a ROM, an EPROM, an EEPROM, a flash memory, and an optical disk.

* * * * *